(12) United States Patent
Silverstein et al.

(10) Patent No.: US 7,871,165 B2
(45) Date of Patent: Jan. 18, 2011

(54) STEREO PROJECTION APPARATUS USING POLARIZED SOLID STATE LIGHT SOURCES

(75) Inventors: Barry D. Silverstein, Rochester, NY (US); Richard P. Corey, Rush, NY (US)

(73) Assignee: Eastman Kodak Company, Rochester, NY (US)

( * ) Notice: Subject to any disclaimer, the term of this patent is extended or adjusted under 35 U.S.C. 154(b) by 531 days.

(21) Appl. No.: 11/948,048

(22) Filed: Nov. 30, 2007

(65) Prior Publication Data

US 2009/0141242 A1 Jun. 4, 2009

(51) Int. Cl.
| | |
|---|---|
| G03B 21/00 | (2006.01) |
| G03B 21/28 | (2006.01) |
| G03B 21/20 | (2006.01) |
| H04N 13/00 | (2006.01) |
| H04N 9/47 | (2006.01) |
| H04N 13/04 | (2006.01) |
| G02B 27/22 | (2006.01) |

(52) U.S. Cl. ............... 353/7; 353/8; 353/81; 353/85; 348/42; 348/55; 359/462; 359/464

(58) Field of Classification Search ............ 353/7–8, 353/20, 31, 81, 122, 85; 359/458, 462, 464–467; 348/42, 51, 54–55, 57–58, 60
See application file for complete search history.

(56) References Cited

U.S. PATENT DOCUMENTS

| | | | |
|---|---|---|---|
| 5,987,043 A * | 11/1999 | Brown et al. | 372/36 |
| 5,993,004 A * | 11/1999 | Moseley et al. | 353/8 |
| 6,240,116 B1 * | 5/2001 | Lang et al. | 372/50.12 |
| 6,594,090 B2 * | 7/2003 | Kruschwitz et al. | 359/707 |
| 6,793,341 B2 | 9/2004 | Svardal et al. | |
| 7,040,760 B2 * | 5/2006 | Nakanishi et al. | 353/20 |
| 7,349,095 B2 * | 3/2008 | Kurosaki | 356/445 |
| 7,360,900 B2 * | 4/2008 | Sakata et al. | 353/20 |
| 7,384,159 B2 * | 6/2008 | Takeda | 353/94 |
| 7,403,320 B2 * | 7/2008 | Bausenwein et al. | 359/290 |
| 7,591,559 B2 * | 9/2009 | Kurosaki | 353/94 |
| 7,764,724 B2 * | 7/2010 | Peterson | 372/108 |
| 7,769,068 B2 * | 8/2010 | Hersman et al. | 372/50.12 |
| 2005/0141076 A1 * | 6/2005 | Bausenwein et al. | 359/291 |
| 2005/0213051 A1 * | 9/2005 | Smet | 353/85 |
| 2006/0291053 A1 | 12/2006 | Robinson et al. | |
| 2007/0127121 A1 | 6/2007 | Maximus et al. | |
| 2009/0122272 A1 * | 5/2009 | Silverstein et al. | 353/81 |
| 2009/0153752 A1 * | 6/2009 | Silverstein | 348/750 |

(Continued)

FOREIGN PATENT DOCUMENTS

WO  2008/139340  12/2007

(Continued)

*Primary Examiner*—Georgia Y Epps
*Assistant Examiner*—Jori S Reilly-Diakun
(74) *Attorney, Agent, or Firm*—Peyton C. Watkins; Kevin E. Spaulding

(57) ABSTRACT

A digital image projector includes a first polarized light source; a second polarized light source that is orthogonal in polarization state to the first polarized light source; a polarization beamsplitter disposed to direct light of either the first or second polarization along a common illumination axis; a MEMS spatial light modulator; and projection optics for delivering imaging light from the MEMS spatial light modulator.

10 Claims, 19 Drawing Sheets

U.S. PATENT DOCUMENTS

2009/0213330 A1* 8/2009 Silverstein et al. .............. 353/8
2009/0284713 A1* 11/2009 Silverstein et al. .............. 353/8
2010/0007852 A1* 1/2010 Bietry et al. .................... 353/8
2010/0103519 A1* 4/2010 Silverstein et al. .......... 359/487

FOREIGN PATENT DOCUMENTS

WO 2008/076104 6/2008

* cited by examiner

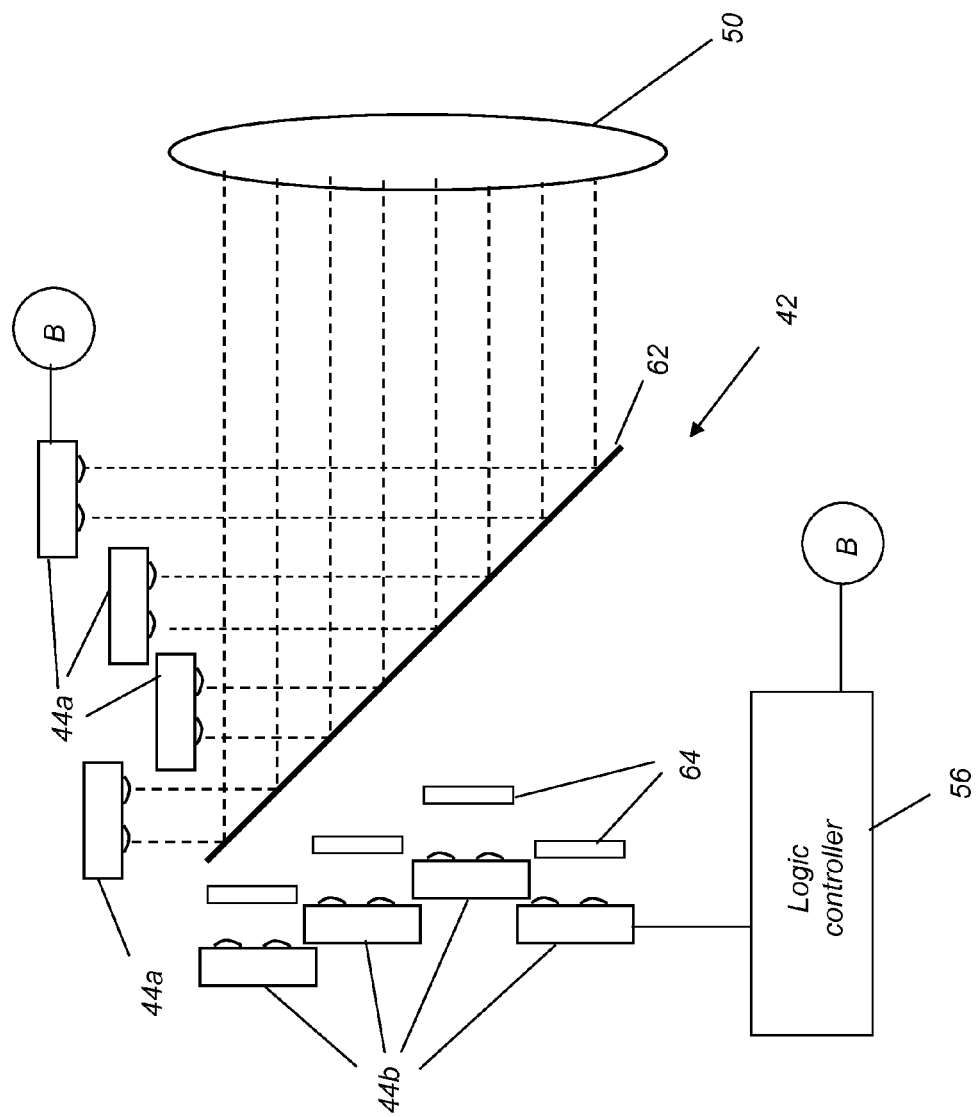

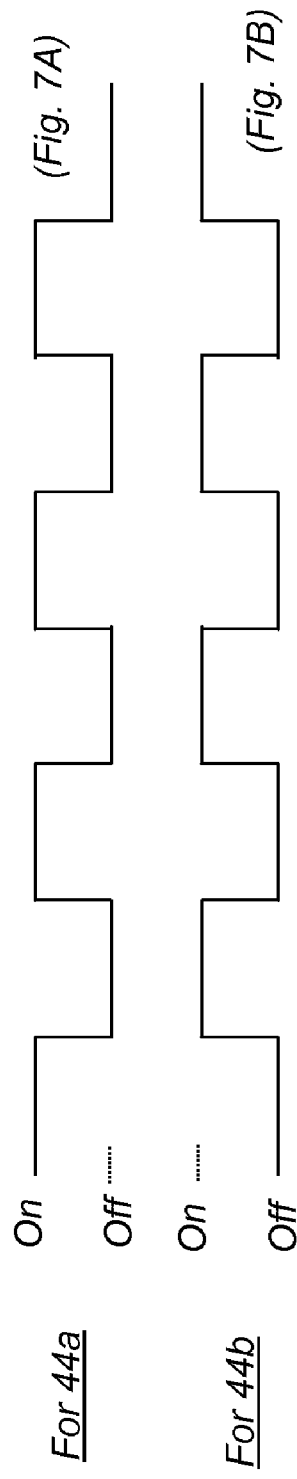

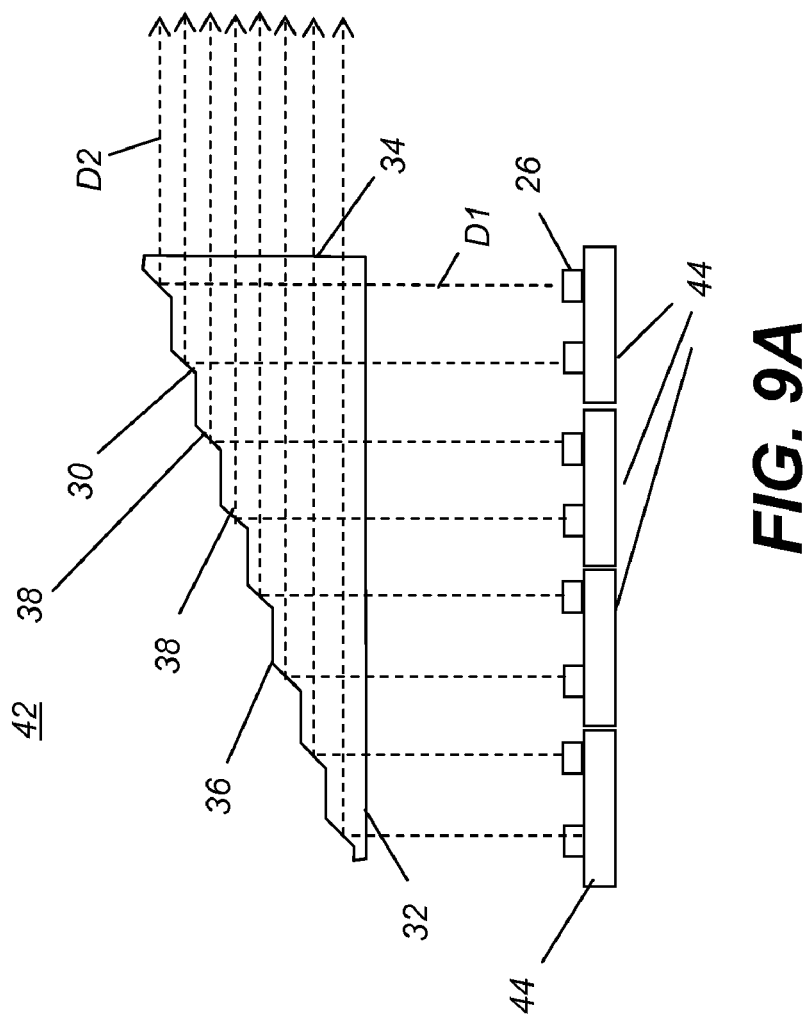

STEREO PROJECTION APPARATUS USING POLARIZED SOLID STATE LIGHT SOURCES

CROSS REFERENCE TO RELATED APPLICATIONS

The present invention is related to the commonly assigned U.S. Patent Application entitled "Projection Apparatus Using Solid-State Light Source Array" filed Nov. 9, 2007, by Barry D. Silverstein et al., U.S. Ser. No. 11/937,729.

FIELD OF THE INVENTION

This invention generally relates to an apparatus for projecting a stereoscopic digital image and more particularly relates to an improved apparatus and method using polarized solid state lasers to create stereoscopic images for digital cinema projection.

BACKGROUND OF THE INVENTION

In order to be considered as suitable replacements for conventional film projectors, digital projection systems must meet demanding requirements for image quality. This is particularly true for multicolor cinematic projection systems. Competitive digital projection alternatives to conventional cinematic-quality projectors must meet high standards of performance, providing high resolution, wide color gamut, high brightness, and frame-sequential contrast ratios exceeding 1,000:1.

Increasingly, the motion picture industry has moved toward the production and display of 3 dimensional (3D) or perceived stereoscopic content in order to offer consumers an enhanced visual experience in large venues. While entertainment companies such as Disney have offered this content in their theme parks for many years and Imax has created specialty theatres for such content, in both those cases film has been the primary medium for image creation. To create the stereo image, two sets of films and projectors simultaneously project orthogonal polarizations, one for each eye. Audience members wear corresponding orthogonally polarized glasses that block one polarized light image for each eye while transmitting the orthogonal polarized light image.

In the ongoing transition of the motion picture industry to digital imaging, some vendors, such as Imax, have continued to utilize a two-projection system to provide a high quality stereo image. More commonly, however, conventional projectors have been modified to enable 3D projection.

The most promising of these conventional projection solutions for multicolor digital cinema projection employ, as image forming devices, one of two basic types of spatial light modulators (SLMs). The first type of spatial light modulator is the Digital Light Processor (DLP) a digital micromirror device (DMD), developed by Texas Instruments, Inc., Dallas, Tex.

FIG. 1 shows a simplified block diagram of a projector apparatus 10 that uses DLP spatial light modulators. A light source 12 provides polychromatic unpolarized light into a prism assembly 14, such as a Philips prism, for example. Prism assembly 14 splits the polychromatic light into red, green, and blue component wavelength bands and directs each band to the corresponding spatial light modulator 20r, 20g, or 20b. Prism assembly 14 then recombines the modulated light from each SLM 20r, 20g, and 20b and provides this unpolarized light to a projection lens 30 for projection onto a display screen or other suitable surface.

DLP-based projectors demonstrate the capability to provide the necessary light throughput, contrast ratio, and color gamut for most projection applications from desktop to large cinema. However, there are inherent resolution limitations with existing devices typically providing no more than 2148× 1080 pixels. In addition, high component and system costs have limited the suitability of DLP designs for higher-quality digital cinema projection. Moreover, the cost, size, weight, and complexity of the Philips or other suitable combining prisms are significant constraints.

The second type of spatial light modulator used for digital projection is the LCD (Liquid Crystal Device). The LCD forms an image as an array of pixels by selectively modulating the polarization state of incident light for each corresponding pixel. LCDs appear to have advantages as spatial light modulators for high-quality digital cinema projection systems. LCOS (Liquid Crystal On Silicon) devices are thought to be particularly promising for large-scale image projection. However, LCD components have difficulty maintaining the high quality demands of digital cinema, particularly with regard to color, contrast, as the high thermal load of high brightness projection affects the materials polarization qualities.

Conventional methods for forming stereoscopic images from these conventional micro-display (DLP or LCOS) based projectors have been based around two primary techniques. The less common technique, utilized by Dolby Laboratories, for example, is similar to that described in US Patent Application Publication No. 2007/0127121 by Maximus et. al., where color space separation is used to distinguish between the left and right eye content. Filters are utilized in the white light illumination system to momentarily block out portions of each of the primary colors for a portion of the frame time. For example, for the left eye, the lower wavelength spectrum of Red, Blue, and Green (RGB) would be blocked for a period of time. This would be followed by blocking the higher wavelength spectrum of Red, Blue, and Green (RGB) for the other eye. The appropriate color adjusted stereo content that is associated with each eye is presented to each modulator for the eye. The viewer wears a corresponding filter set that similarly transmits only one of the two 3-color (RGB) spectral sets. This system is advantaged over a polarization based projection system in that its images can be projected onto most screens without the requirement of utilizing a custom polarization-maintaining screen. It is disadvantaged, however, in that the filter glasses are expensive and the viewing quality can be reduced by angular shift, head motion, and tilt. Additionally, adjustment of the color space can be difficult and there is significant light loss due to filtering, leading to either a higher required lamp output or reduced image brightness.

The second approach utilizes polarized light. One method, assigned to InFocus Corporation, Wilsonville, Oreg., in U.S. Pat. No. 6,793,341 to Svardal et al., utilizes each of two orthogonal polarization states delivered to two separate spatial light modulators. Polarized light from both modulators is projected simultaneously. The viewer wears polarized glasses with polarization transmission axes for left and right eyes orthogonally oriented with respect to each other. Although this arrangement offers efficient use of light, it can be a very expensive configuration, especially in projector designs where a spatial light modulator is required for each color band. In another approach, a conventional projector is modified to modulate alternate polarization states that are rapidly switched from one to the other. This can be done, for example, where a DLP projector has a polarizer placed in the output path of the light, such as at a position 16 indicated by a dashed line in FIG. 1. The polarizer is required as the DLP is not inherently designed to maintain the polarization of the input light as the window of the device package depolarizes due to stress induced birefringence. An achromatic polarization switcher, similar to the type described in US Patent Application Publication No. 2006/0291053 by Robinson et al. could be used at position 16 after the polarizer. A switcher of this type alternately rotates polarized light between two orthogonal polarization states, such as linear polarization states, to allow the presentation of two distinct images, one to each eye, while the user wears polarized glasses.

Real-D systems historically have utilized left and right circularly polarized light, where the glasses are made of a combination ¼ wave retarder plus a polarizer to change the circularly polarized light back to linearly polarized light before blocking one state. This apparently is less sensitive to head tilt and the achromatic polarization switcher is easier to fabricate. The glasses, however, add expense over embodiments that simply use a polarizer. In either case, the display screen must substantially maintain the polarization state of the incident image-bearing light and is, therefore, typically silvered. Silvered screens are more costly and exhibit angular sensitivity for gain. While this system is of some value, there is a significant light loss with MEMS based systems since they require polarization, which reduces the output in half. Similarly, there is additional light loss and added cost from the polarization switcher. LCOS based projectors are advantaged in that the output is typically already polarized in most configurations. These projectors are commonly more costly due to the difficulty of maintaining high polarization control through high angle optics. Therefore any gains in efficiency are offset by other costs.

A continuing problem with illumination efficiency relates to etendue or, similarly, to the Lagrange invariant. As is well known in the optical arts, etendue relates to the amount of light that can be handled by an optical system. Potentially, the larger the etendue, the brighter the image. Numerically, etendue is proportional to the product of two factors, namely the image area and the numerical aperture. In terms of the simplified optical system represented in FIG. 2 having light source 12, optics 18, and a spatial light modulator 20, etendue is a factor of the area of the light source A1 and its output angle $\theta 1$ and is equal to the area of the modulator A2 and its acceptance angle $\theta 2$. For increased brightness, it is desirable to provide as much light as possible from the area of light source 12. As a general principle, the optical design is advantaged when the etendue at the light source is most closely matched to the etendue at the modulator.

Increasing the numerical aperture, for example, increases etendue so that the optical system captures more light. Similarly, increasing the source image size, so that light originates over a larger area, increases etendue. In order to utilize an increased etendue on the illumination side, the etendue must be greater than or equal to that of the illumination source. Typically, however, the larger the image, the more costly. This is especially true of devices such as LCOS and DLP components, where the silicon substrate and defect potential increase with size. As a general rule, increased etendue results in a more complex and costly optical design.

Efficiency improves when the etendue of the light source is well-matched to the etendue of the spatial light modulator. Poorly matched etendue means that the optical system is either light-starved, unable to provide sufficient light to the spatial light modulators, or inefficient, effectively discarding a substantial portion of the light that is generated for modulation.

The goal of providing sufficient brightness for digital cinema applications at an acceptable system cost has eluded designers of both LCD and DLP systems. LCD-based systems have been compromised by the requirement for polarized light, reducing efficiency and increasing etendue, even where polarization recovery techniques are used. DLP device designs, not requiring polarized light, have proven to be somewhat more efficient, but still require expensive, short lived lamps and costly optical engines, making them too expensive to compete against conventional cinema projection equipment.

In order to compete with conventional high-end, film-based projection systems and provide what has been termed electronic or digital cinema, digital projectors must be capable of achieving comparable cinema brightness levels to this earlier equipment. As some idea of scale, the typical theatre requires on the order of 10,000 lumens projected onto screen sizes on the order of 40 feet in diagonal. The range of screens requires anywhere from 5,000 lumens to upwards of 40,000 lumens. In addition to this demanding brightness requirement, these projectors must also deliver high resolution (2048×1080 pixels) and provide around 2000:1 contrast and a wide color gamut.

Some digital cinema projector designs have proved to be capable of this level of performance. However, high equipment cost and operational costs have been obstacles. Projection apparatus that meet these requirements typically cost in excess of $50,000 each and utilize high wattage Xenon arc lamps that need replacement at intervals between 500-2000 hours, with typical replacement cost often exceeding $1000. The large etendue of the Xenon lamp has considerable impact on cost and complexity, since it necessitates relatively fast optics to collect and project light from these sources.

One drawback common to both DLP and LCOS LCD spatial light modulators (SLM) has been their limited ability to use solid-state light sources, particularly laser sources. Although they are advantaged over other types of light sources with regard to relative spectral purity and potentially high brightness levels, solid-state light sources require different approaches in order to use these advantages effectively. Conventional methods and devices for conditioning, redirecting, and combining light from color sources, used with earlier digital projector designs, can constrain how well laser array light sources are used.

Solid-state lasers promise improvements in etendue, longevity, and overall spectral and brightness stability but, until recently, have not been able to deliver visible light at sufficient levels and at costs acceptable for digital cinema. In a more recent development, VCSEL (Vertical Cavity Surface-Emitting Laser) laser arrays have been commercialized and show some promise as potential light sources. However, brightness is not yet high enough; the combined light from as many as nine individual arrays is needed in order to provide the necessary brightness for each color.

There are other difficulties with conventional approaches using solid-state arrays for digital projectors. A monolithic array of coherent lasers could be used, for example, such as the microlaser array described in U.S. Pat. No. 5,704,700 entitled "Laser Illuminated Image Projection System and Method of Using Same" to Kappel et al. With this type of approach, the number of lasers is selected to match the power requirements of the lumen output of the projector. In a high lumen projector, however, this approach presents a number of difficulties. Manufacturing yields drop as the number of devices increases and heat problems can be significant with larger scale arrays. Coherence can also create problems for monolithic designs. Coherence of the laser sources typically causes artifacts such as optical interference and speckle. It is, therefore, preferable to use an array of lasers where coherence, spatial and temporal coherence is weak or negligible. While spectral coherence is desirable from the standpoint of improved color gamut, a small amount of spectral broadening is also desirable for reducing sensitivity to interference and speckle and also lessens the effects of color shift of a single spectral source. This shift could occur, for example, in a three-color projection system that has separate red, green and blue laser sources. If all lasers in the single color arrays are connected together and of a narrow wavelength, and a shift occurs in the operating wavelength, the white point and color of the entire projector may fall out of specification. On the other hand, where the array is averaged with small variations in the wavelengths, the sensitivity to single color shifts in the overall output is greatly reduced. While components may be added to the system to help mitigate coherence, most means of reducing coherence beyond the source utilize components such as diffusers that increase the effective extent of the source (etendue). This can cause additional light loss and add expense to the system. Maintaining the small etendue of the lasers enables a simplification of the optical train for illumination, which is highly desirable.

Laser arrays of particular interest for projection applications are various types of VCSEL arrays, including VECSEL (Vertical Extended Cavity Surface-Emitting Laser) and NECSEL (Novalux Extended Cavity Surface-Emitting Laser) devices from Novalux, Sunnyvale, Calif. However, conventional solutions using these devices have been prone to a number of problems. One limitation relates to device yields. Due largely to heat and packaging problems for critical components, the commercialized VECSEL array is extended in length, but limited in height; typically, a VECSEL array has only two rows of emitting components. The use of more than two rows tends to dramatically increase yield difficulties. This practical limitation would make it difficult to provide a VECSEL illumination system for projection apparatus. In addition to these problems, conventional VECSEL designs are prone to difficulties with power connection and heat sinking. These lasers are of high power; for example, a single row laser device, frequency doubled into a two row device from Novalux produces over 3 W of usable light. Thus, there can be significant current requirements and heat load from the unused current. Lifetime and beam quality is highly dependent upon stable temperature maintenance.

Coupling of the laser sources to the projection system presents another difficulty that is not adequately addressed using conventional approaches. For example, using Novalux NESEL lasers, approximately nine 2 row by 24 laser arrays are required for each color in order to approximate the 10,000 lumen requirement of most theatres. It is desirable to separate these sources, as well as the electronic delivery and connection and the associated heat from the main thermally sensitive optical system to allow optimal performance of the projection engine. Other laser sources are possible, such as conventional edge emitting laser diodes. However, these are more difficult to package in array form and traditionally have a shorter lifetime at higher brightness levels.

Conventional solutions do not adequately address the problems of etendue-matching of the laser sources to the system and of thermally separating the illumination sources from the optical engine. Moreover, conventional solutions do not address ways to use polarized light from the laser devices more effectively.

Thus, it can be seen that there is a need for illumination solutions that capitalize on the advantages of polarized laser light sources for stereoscopic digital cinema projection systems.

SUMMARY OF THE INVENTION

It is an object of the present invention to address the need for stereoscopic imaging with digital spatial light modulators such as DLP and LCOS and related microdisplay spatial light modulator devices. With this object in mind, the present invention provides a digital image projector comprising a first polarized light source; a second polarized light source that is orthogonal in polarization state to the first polarized light source; a polarization beamsplitter disposed to direct light of either the first or second polarization along a common illumination axis; a MEMS spatial light modulator; and projection optics for delivering imaging light from the MEMS spatial light modulator.

It is a feature of the present invention that it provides ways for improved etendue matching between illumination and modulation components.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

FIG. 7A is a schematic side-view diagram showing the use of a polarization beamsplitter for directing illumination of one polarization state from multiple solid-state light arrays in one embodiment;

FIG. 8 is a timing diagram that shows the alternating timing of polarization states used for stereo image presentation;

FIG. 9A is a schematic side-view diagram showing the use of a light-redirecting prism for combining illumination from multiple solid-state light arrays in one embodiment;

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Figures shown and described herein are provided to illustrate principles of operation according to the present invention and are not drawn with intent to show actual size or scale. Because of the relative dimensions of the component parts for the laser array of the present invention, some exaggeration is necessary in order to emphasize basic structure, shape, and principles of operation.

This invention may be utilized with Micro-Electromechanical Structures (MEMS) base modulators because they do not vary the polarization of the incoming light on a individual pixel basis. MEMS devices include micro-mirror structures such as the Texas Instruments DLP, Grating Light valve devices such as the Kodak GEMs, and light shutter devices such as the Unipixel Opcuity structure.

Embodiments of the present invention address the need for improved brightness in a stereoscopic viewing system using independently addressed polarized laser light sources and provide solutions that can also allow ease of removal and modular replacement of laser assemblies. Embodiments of the present invention additionally provide features that reduce thermal effects that might otherwise cause thermally induced stress birefringence in optical components that are used with polarization based projectors. Embodiments of the present invention take advantage of the inherent polarization of light that is emitted from a VECSEL laser array or other type of solid-state light array.

Figure 3B:
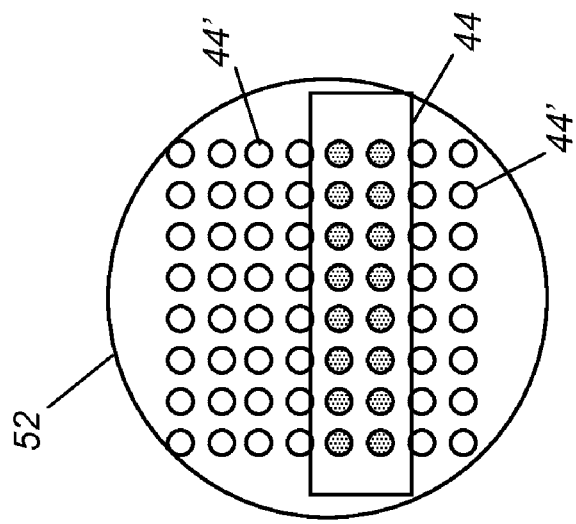
FIGS. 3A, and 3B are plan views showing the relative fill factor of different solid-state light array-to-light guide combinations.
Figure 3A:
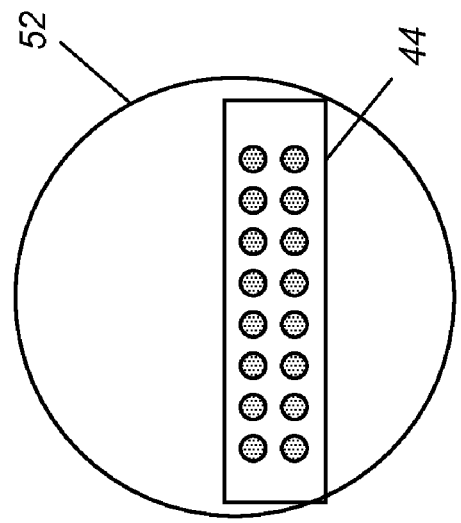

Referring to FIGS. 3A and 3B the aspect ratio of a solid state light array 44 is shown in cross section, relative to an arbitrary aperture. As shown in FIG. 3A, the aperture is underfilled, which may easily cause a poor etendue match at the spatial light modulator. In FIG. 3B, the aspect ratio of the light source uses combined arrays 44 and 44' to achieve a better match to the circular aperture shown. Methods of combining multiple arrays 44 are described subsequently.

One approach used to reduce thermal loading by embodiments of the present invention is to isolate the light sources from light modulation components using a waveguide structure. Light from multiple solid-state light source arrays is coupled into optical waveguides that deliver the light to the modulation device. When this is done, the geometry of the light source-to-waveguide interface can be optimized so that the waveguide output is well-matched to the aspect ratio of the spatial light modulator. In practice, this means that the waveguide aperture is substantially filled or slightly underfilled for maintaining optimal etendue levels. This arrangement also helps to minimize the speed requirement of illumination optics.

Figure 4:
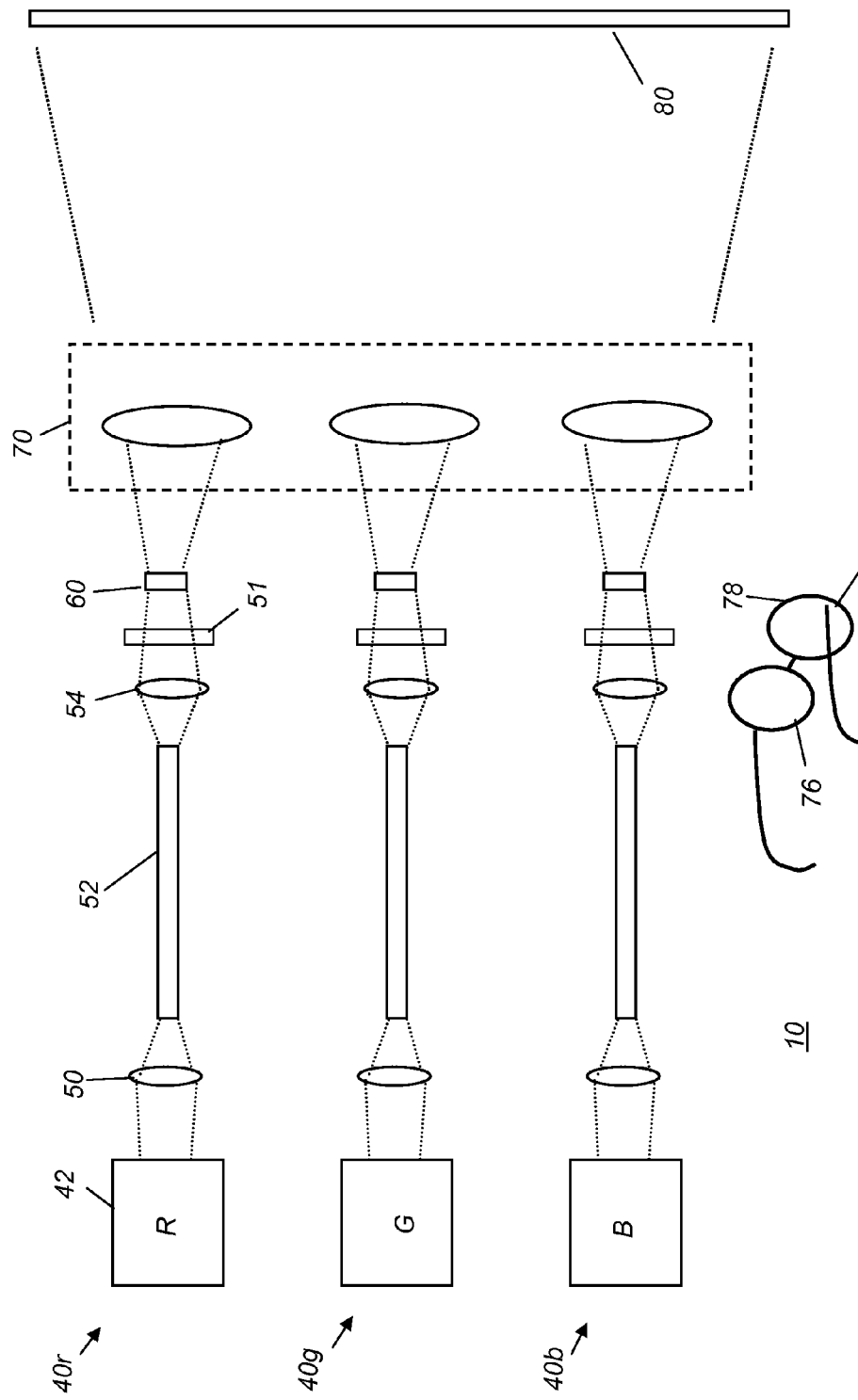
FIG. 4 is a schematic block diagram showing the general arrangement of a projection apparatus in some embodiments.

In order to better understand the present invention, it is instructive to describe the overall context within which apparatus and methods of the present invention can be operable. The schematic diagram of FIG. 4 shows a basic arrangement for projection apparatus 10 that is used in a number of embodiments of the present invention. Three light modulation assemblies 40r, 40g, and 40b are shown, each modulating one of the primary Red, Green, or Blue (RGB) colors from an illumination combiner 42. In each light modulation assembly 40r, 40g, and 40b, an optional lens 50 directs light into a polarization maintaining light guide 52. At the output of light guide 52, a lens 54 directs light through an integrator 51, such as a fly's eye integrator or integrating bar, for example, to a spatial light modulator 60, which may be a DLP or other MEMS spatial light modulator component. In the apparatus of the present invention, this modulator must accept incident light of two orthogonal input polarization states and must preserve this polarization difference, providing as output light of two orthogonal polarization states that correspond to the respective input states. The output polarization states may, however, be rotated with respect to the input states. Projection optics 70, indicated generally in a dashed outline in FIG. 4 due to many possible embodiments, then directs the modulated light to a display surface 80. Polarized glasses 58, worn by the viewer, have polarizers 76 and 78 that have orthogonal polarization axes that allow the left and right-eye images to be viewed independently. The overall arrangement shown in FIG. 4 is a basic model used for subsequent embodiments of the present invention, with various arrangements used for illumination combiner 42.

Figure 5A:
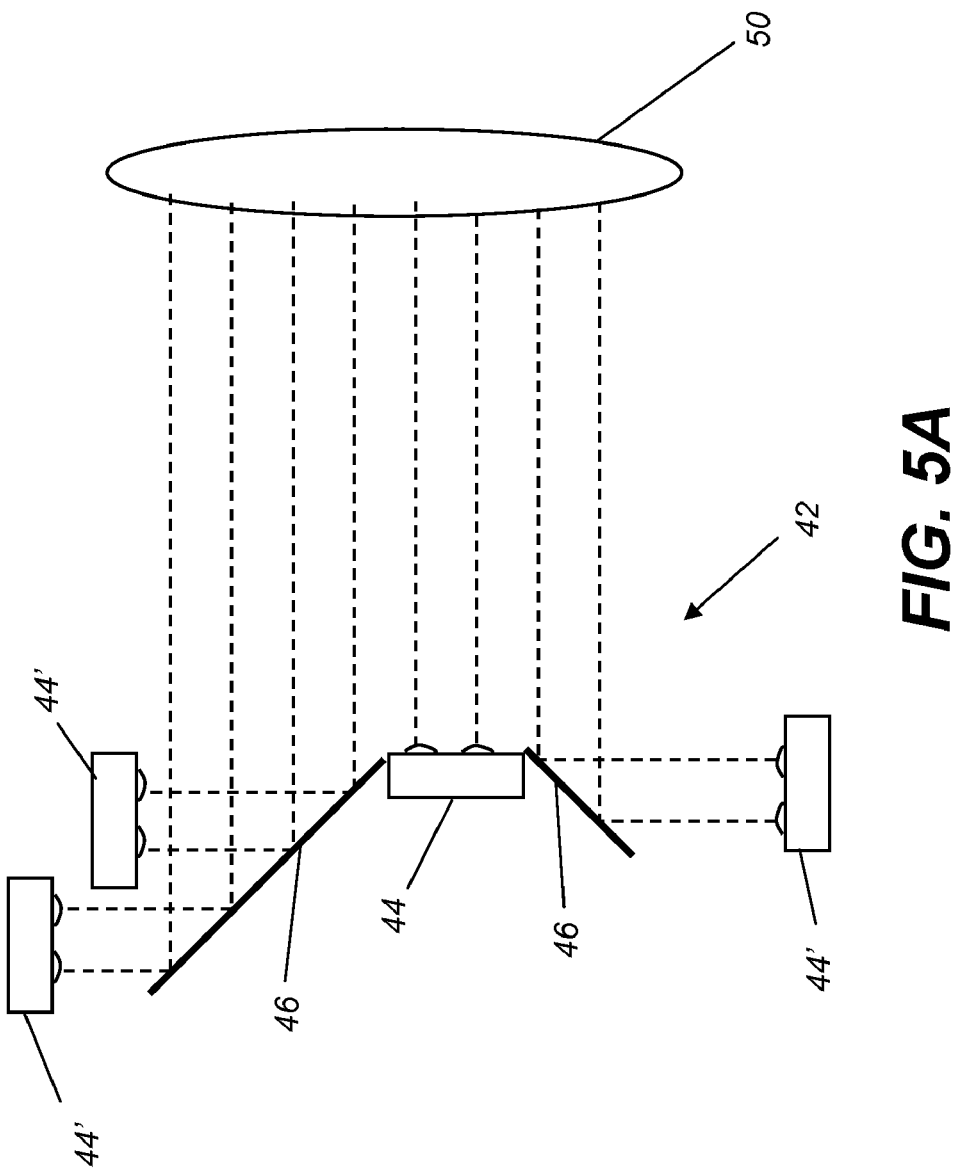
FIG. 5A is a schematic side-view diagram showing one method for combining light from multiple solid-state light arrays along the same illumination path.
Figure 5B:
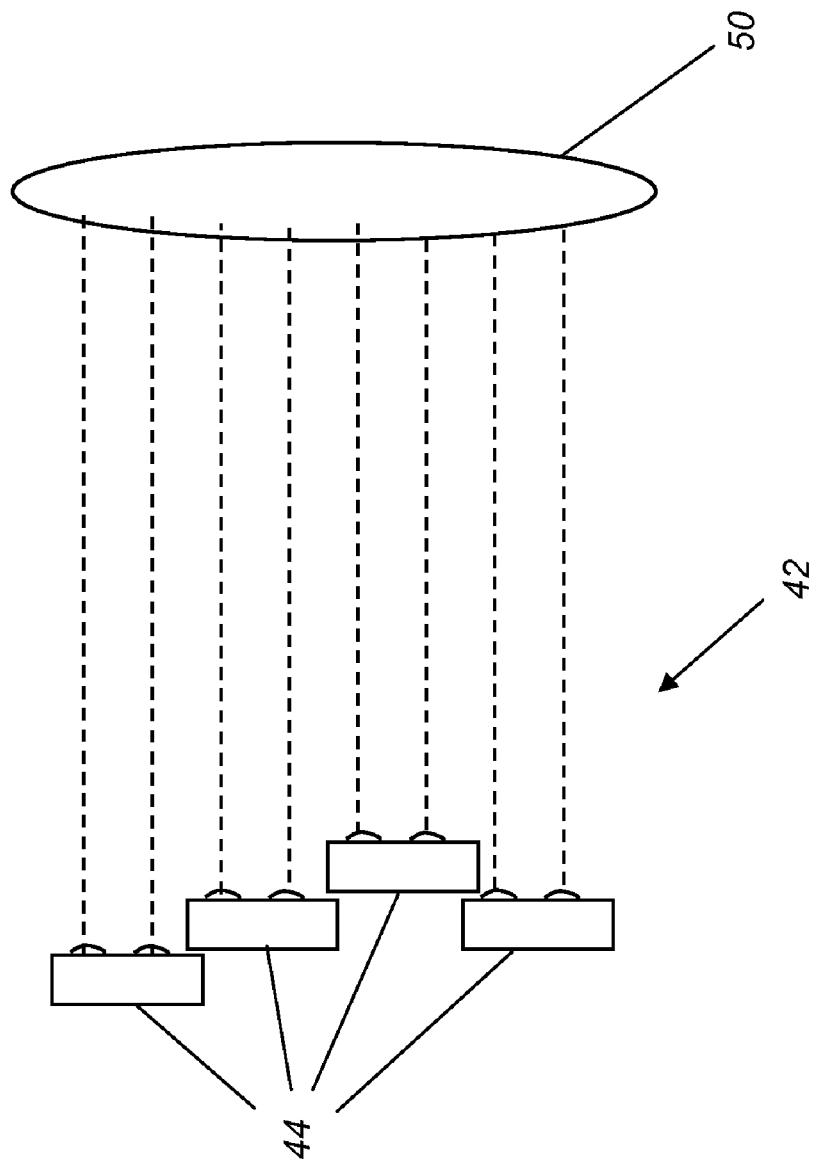
FIG. 5B is a schematic side-view diagram showing an alternate method for combining light from multiple solid-state light arrays along the same illumination path.
Figure 6:
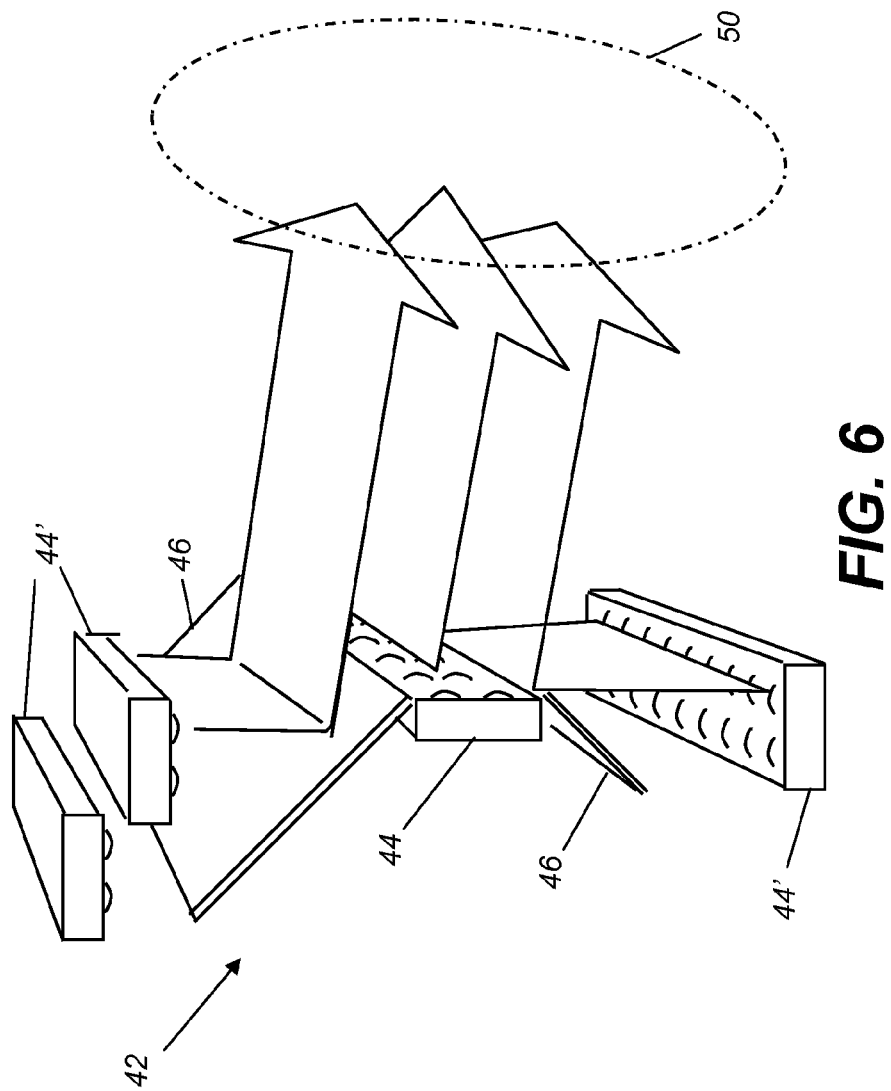
FIG. 6 is a perspective view of the configuration for combining light shown in FIG. 5A.

FIG. 5A shows one approach for combining multiple arrays 44 and 44' to form a larger array. FIG. 6 shows the configuration of FIG. 5A in perspective view. In FIG. 5A, one or more interspersed mirrors 46 may be used to place the optical axis of additional arrays 44' in line with array 44 to provide the arrangement shown in cross-section in FIG. 3B. A more direct example using combined arrays 44 is shown in FIG. 5B. However, it can be appreciated that heat and spacing requirements may limit how many arrays 44 can be stacked in this manner.

Figure 7B:
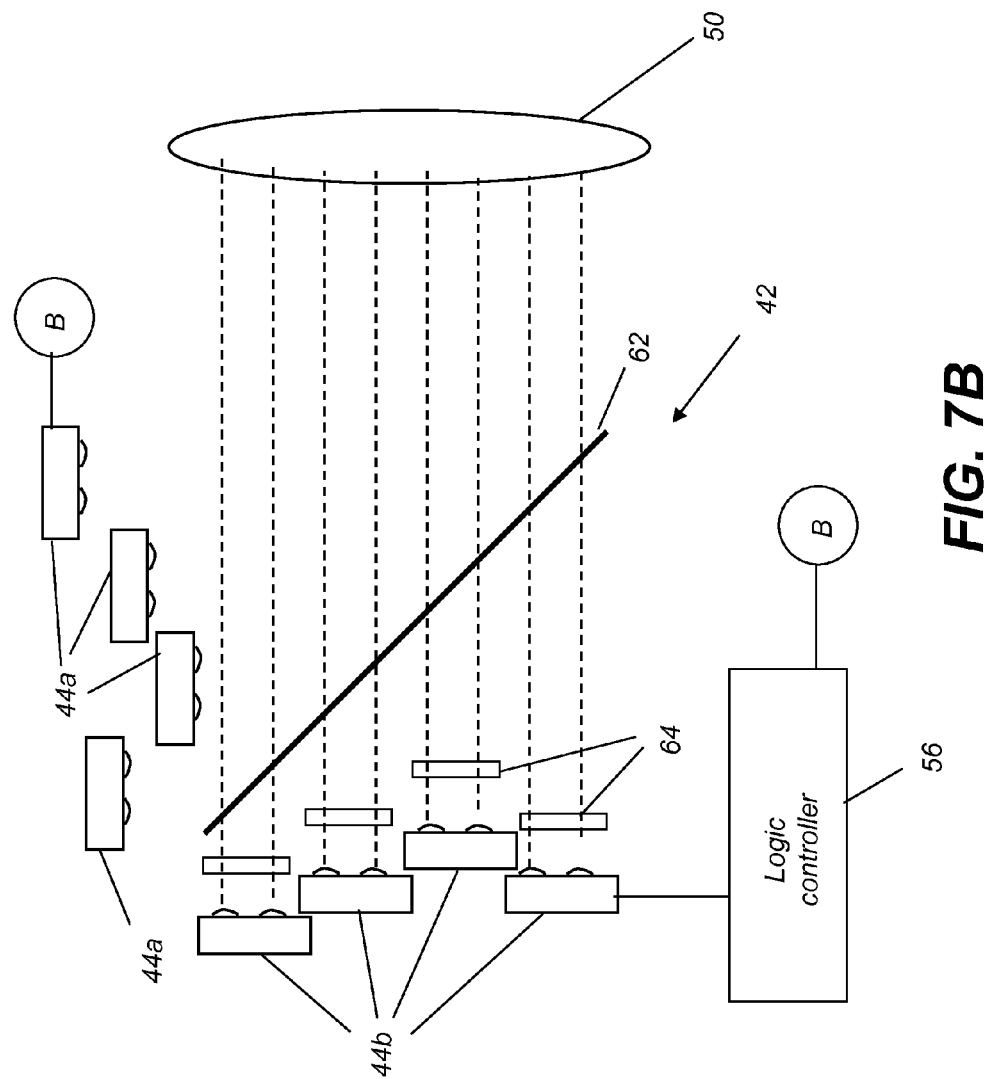
FIG. 7B is a schematic side-view diagram showing the use of a polarization beamsplitter for directing illumination of orthogonal polarization states from multiple solid-state light arrays in one embodiment.

The arrangements shown in FIGS. 5A, 5B, and 6 can be modified somewhat to allow the use of polarized light having different polarization states, as shown in FIGS. 7A and 7B and in the timing chart of FIG. 8.

FIGS. 7A and 7B show an approach for combining multiple arrays 44a and 44b in order to form a larger array. FIG. 7A shows solid-state light arrays 44a directing light to a polarization beam splitter (PBS) that reflects light of one polarization state toward lens 50. FIG. 7B shows solid state light arrays 44b directing light through half wave plates 64, thereby changing the original polarization state of the emitted light. This light transmits through polarization beamsplitter 62. A logic controller 56 controls the timing of solid-state light arrays 44a and 44b.

The timing diagram of FIG. 8 shows, within any one of light modulation assemblies 40r, 40g, and 40b, how light that is directed to the same spatial light modulator 60 (FIG. 4) can be rapidly alternated between two orthogonal polarization states to provide left- and right-eye images accordingly. Here, there are two banks of polarized lasers, shown as solid state laser arrays 44*a* and 44*b*. Polarized lasers at arrays 44*a* and 44*b* provide light of orthogonal polarization states, such as using half wave plates 64 for one of these banks of arrays. During one half of the alternating illumination cycle, arrays 44*a* are energized, as shown in FIG. 7A. This light reflects from a polarization beamsplitter 62. In the other half of the alternating illumination cycle, arrays 44*b* are energized, as shown in FIG. 7B. This light is transmitted through polarization beamsplitter 62. For non-stereoscopic applications, the light from both polarized lasers 44*a* and 44*b* may be used together to provide a brighter imager, or used at half power to balance the lifetime each laser source.

This arrangement advantageously puts light of either polarization on the same illumination axis. The etendue with this approach remains the same as in the configuration shown earlier for a single channel in FIG. 5B. Therefore in non-stereoscopic applications, where both polarization states are imaged, the brightness of the source effectively doubles. However, in the case where stereo imaging is desired, only a single source is utilized at one particular moment in time, so that the effective brightness remains the same as with the FIG. 5B arrangement.

Figure 9B:
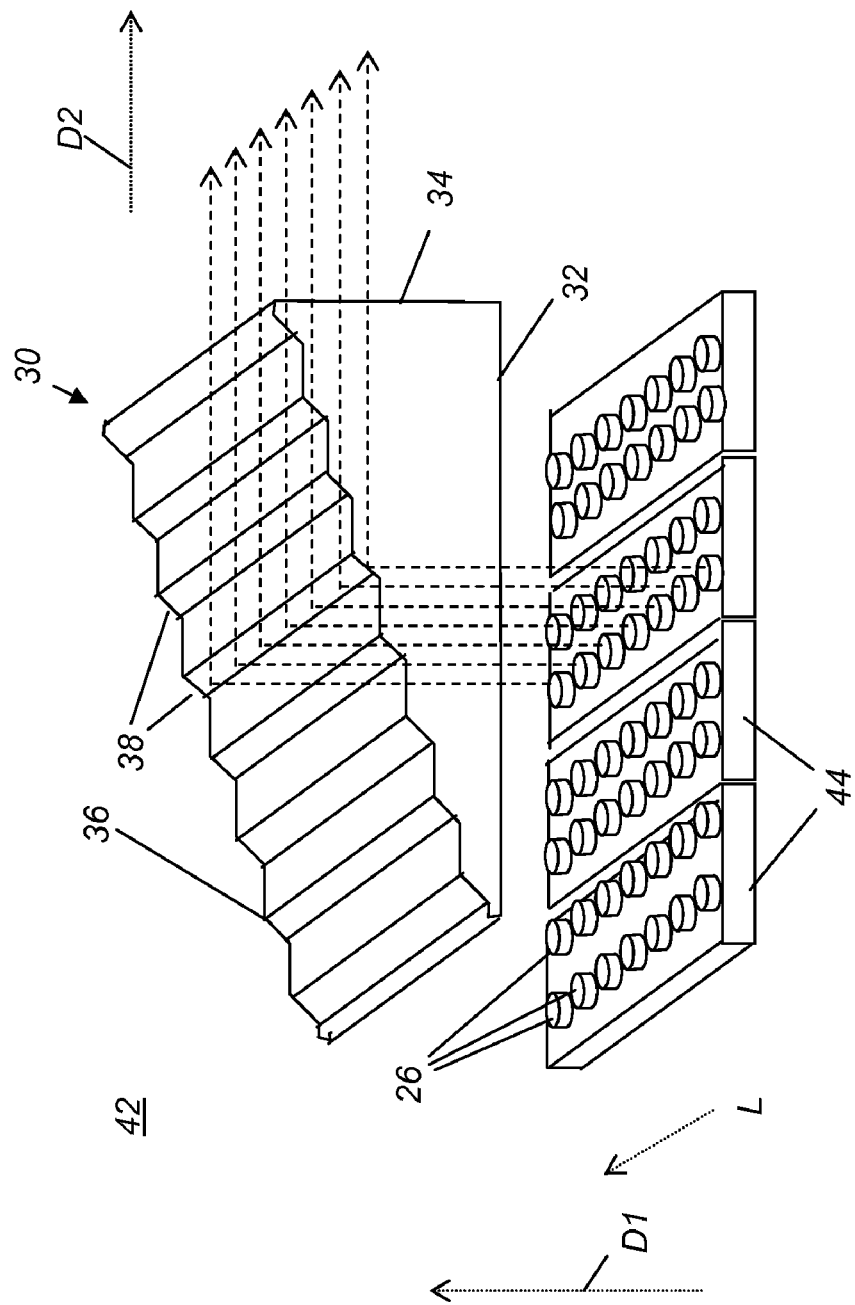
FIG. 9B is a perspective view of the light-redirecting prism of FIG. 9A.

FIGS. 9A and 9B show side and orthogonal views, respectively, of an embodiment of illumination combiner 42 that combines laser light from four solid-state light arrays 44, concentrated within a smaller area. A light-redirecting prism 30 has an incident face 32 that accepts light emitted from array 44 in an emission direction D1. Light is redirected to an output direction D2 that is substantially orthogonal to emission direction D1. Light redirecting prism 30 has a redirection surface 36 that has light-redirecting facets 38. Light-redirecting facets 38 are at an oblique angle relative to emission direction D1 and provide Total Internal Reflection (TIR) to light emitted from lasers 26. When staggered as shown in FIGS. 9A and 9B, these features help to narrow the light path for this illumination, providing a narrower light beam. As FIG. 9B shows, light arrays 44 have multiple lasers 26 that extend in a length direction L. Light-redirecting facets 38 and other facets on redirection surface 36 also extend in direction L.

Figure 10:
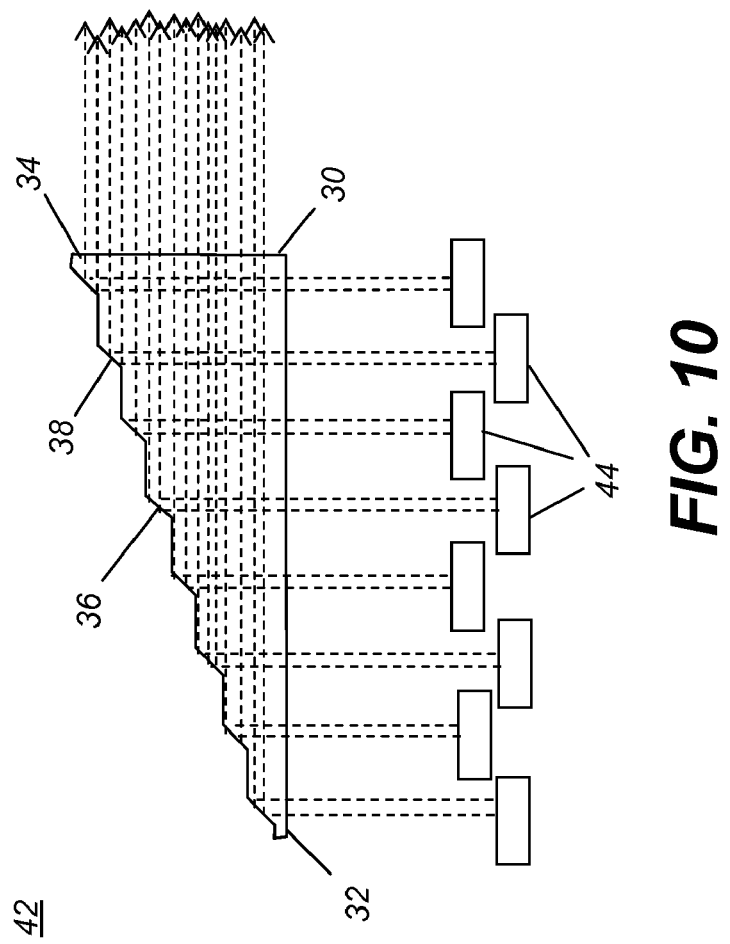
FIG. 10 is a schematic side view of a light-redirecting prism in an alternate embodiment.

A number of variations are possible. For example, the cross-sectional side view of FIG. 10 shows an alternate embodiment in which light-directing facets 38 of light redirecting prism 30 are scaled to redirect light from multiple rows of lasers 26 at a time. Incident face 32 may not be normal with respect to emission direction D1, allowing some offset to the arrangement of light arrays 44 and requiring that the index of refraction n of light redirecting prism 30 be taken into account.

Figure 11:
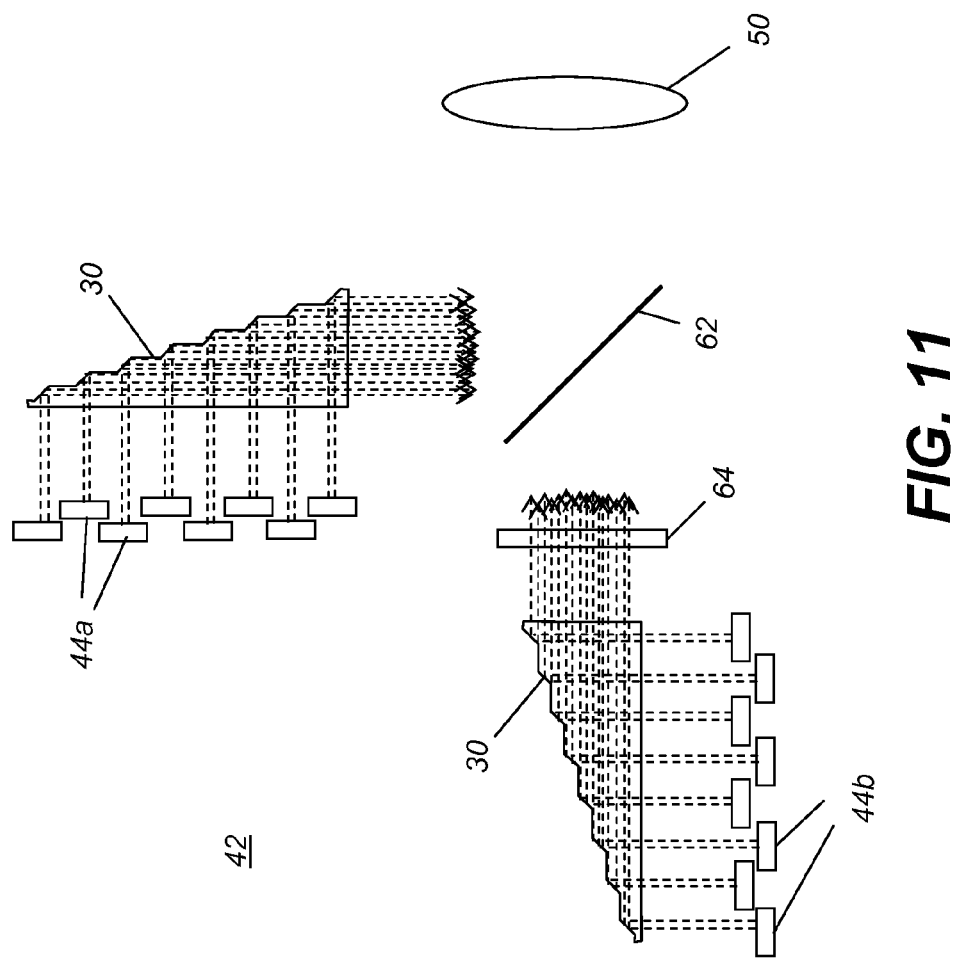
FIG. 11 is a schematic side view showing the use of two light-redirecting prisms for providing light of orthogonal polarizations from a solid-state light array.

The schematic block diagram of FIG. 11 shows how multiple light redirecting prisms 30 can be utilized to provide increased brightness in an embodiment that uses alternating polarization states. As was described earlier with reference to FIGS. 7A and 7B, alternating illumination from light arrays 44*a* and 44*b*, through polarization beamsplitter 62, directs light of orthogonal polarization states to spatial light modulator 60 for providing a stereoscopic image.

Figure 12:
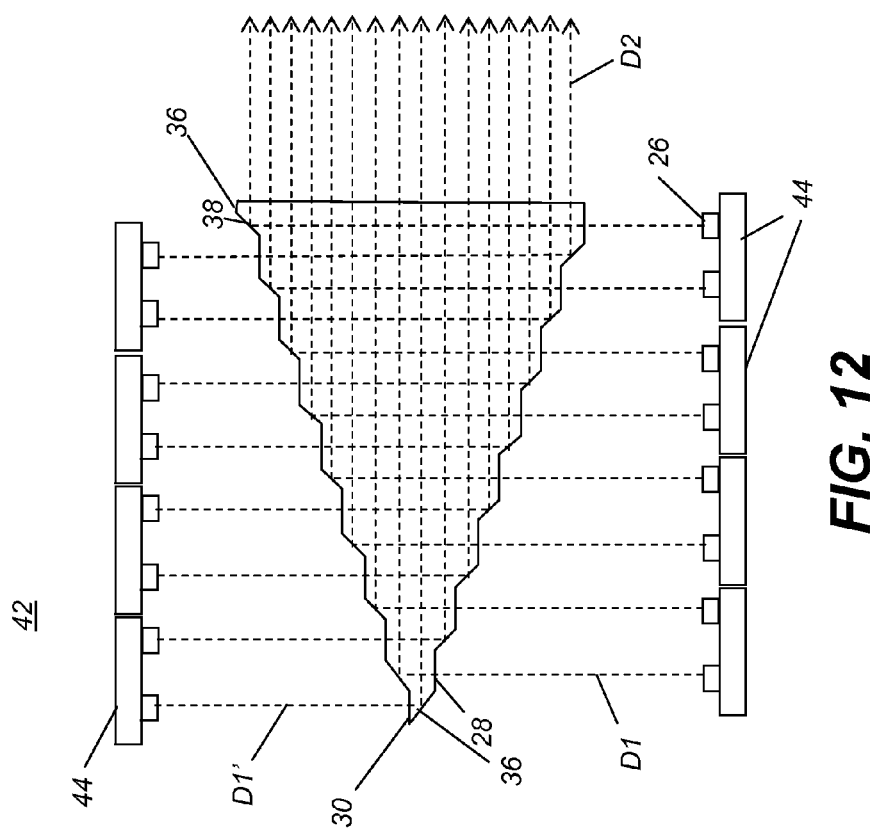
FIG. 12 is a schematic side view showing the use of an embodiment of a light-redirecting prism that accepts light from both sides.

The cross-sectional side view of FIG. 12 shows another embodiment of light-redirecting prism 30 in illumination combiner 42 that provides an even more compact arrangement of illumination than the embodiment shown in FIGS. 9A-10 for using solid-state arrays. In this embodiment, light redirecting prism has two redirection surfaces 36, accepting light from arrays 44 that are facing each other, with opposing emission directions D1 and D1'. Each redirection surface 36 has two types of facets: a light-redirecting facet 38 and an incidence facet 28 that is normal to the incident light from the corresponding array 44. This allows for easier alignment of the various laser modules to the light-redirecting prism 30 by retro-reflection of a small residual light from an anti-reflection coated face back into each of the lasers. This retro-reflection can be useful as a means of creating a subtle external cavity that may induce mode instability in laser. While such mode hopping may be considered noise under typical applications, this noise can add value in projection by further reducing the laser coherence (and inter-laser coherence) thereby reducing visual speckle at the image plane. Additionally, with this dual sided approach, laser modules are interleaved with light from differing modules neighboring each other, providing a source of further spatial mixing when the light is optically integrated further in the optical system. This again helps to reduce possible speckle and increase system uniformity.

While it can be seen that this orientation of the prism 30 to laser 44 is preferred, normal incidence light with respect to the input or output faces is not required for combining the illumination sources. It is required, however, that the redirected light beams exiting the prism 30 at surface(s) 34 be substantially parallel to each other. Achieving this requires careful consideration of a number of factors. These factors include the combination of the angle of incidence of the lasers 44 on each side to input facets on each side (as these angles may be different) and the refraction in the prism based on the index of refraction of the material. In addition, the reflection from the light redirecting facets 38 from each side (again, these may be different on each side) must be considered and its combination with the refraction of the prism must cooperate so that output light beams from the exit face(s) are in parallel.

Figure 13:
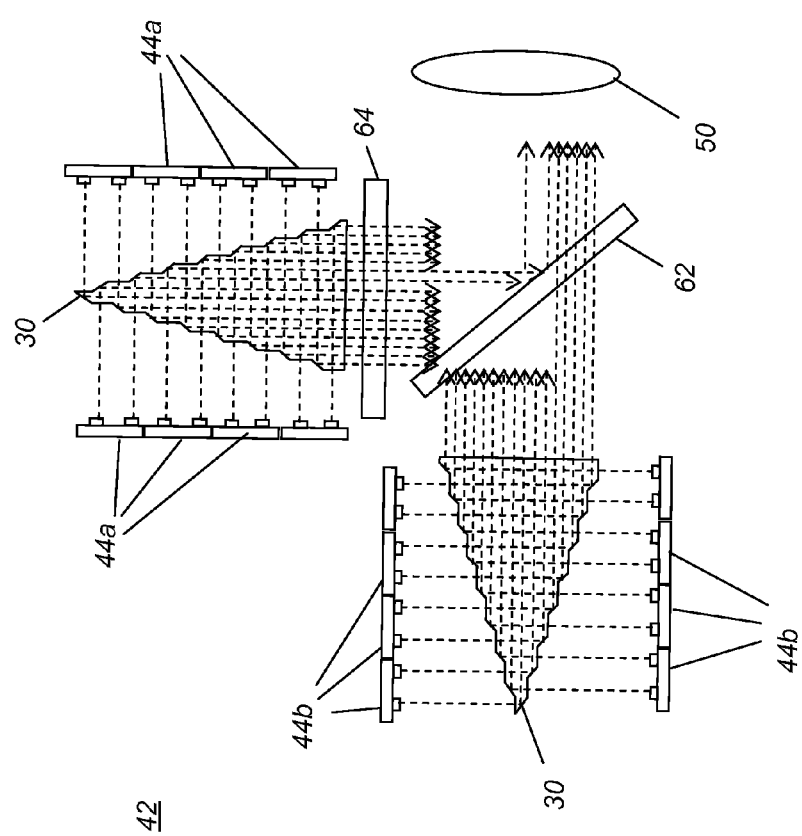
FIG. 13 is a schematic side view of an illumination apparatus using a light-redirecting prism of FIG. 12 for light of each polarization.
Figure 14:
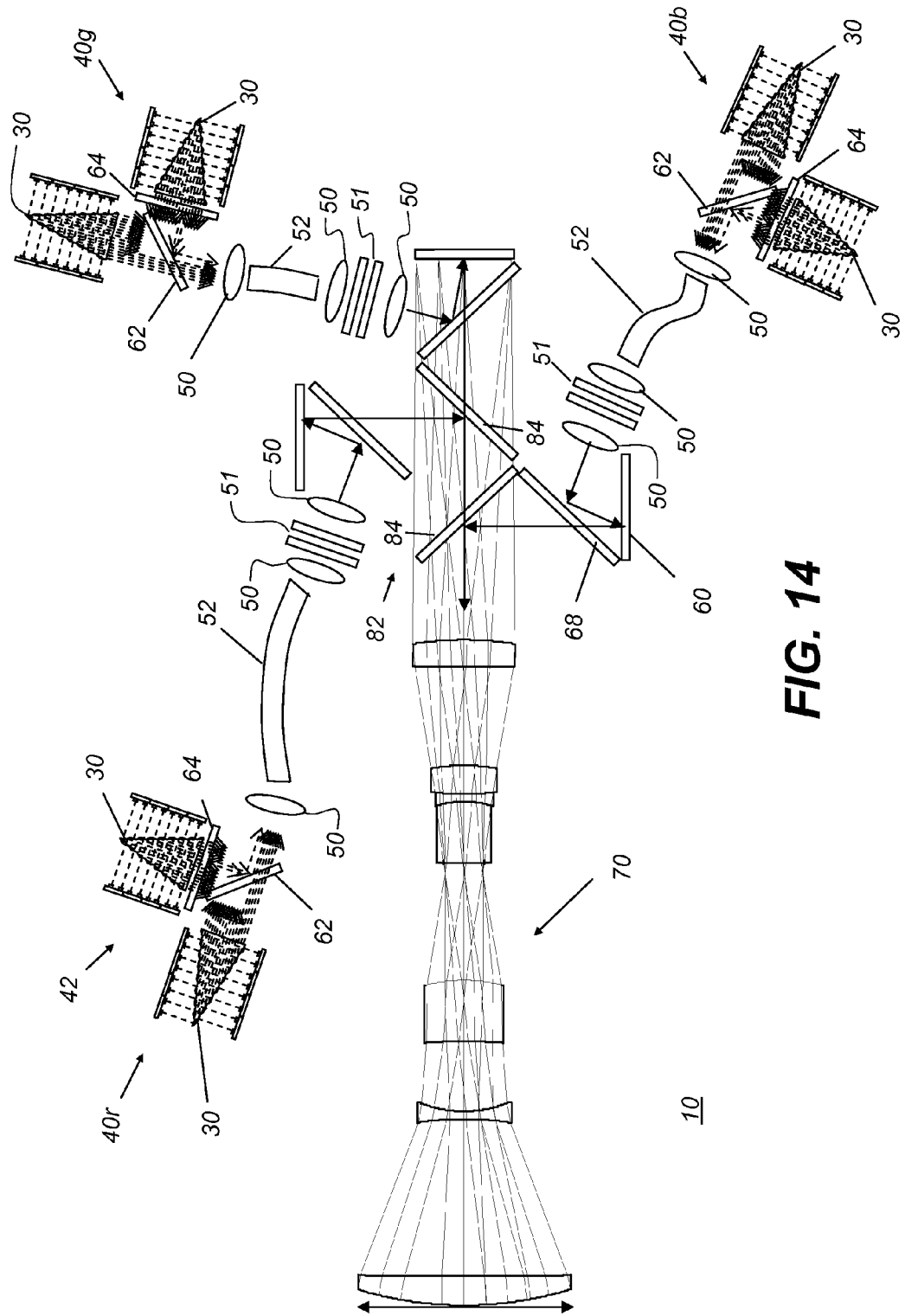
FIG. 14 is a schematic diagram of a projection apparatus using polarized illumination with the light-redirecting prisms of FIG. 12.

The schematic block diagram of FIG. 14 shows an embodiment of projector apparatus 10 that uses light-redirecting prisms 30 in each color channel. Each light modulation assembly 40*r*, 40*g*, and 40*b* has a pair of light redirecting prisms 30 with a similar arrangement of polarization-directing components as that described for FIG. 13. In each light modulation assembly, polarized light from one or the other light redirecting prism 30 is directed through polarization maintaining light guide 52 to lens 50 and integrator 51 through polarization beamsplitter 62. Spatial light modulator 60 is a digital micromirror or other device that modulates light maintaining two orthogonal orientations of output light related to the orthogonal orientations of the input light. In the embodiment shown, designed to use the angular modulation of a micromirror device, thin film coated surface 68 is treated to reflect or transmit incident light according to its incident angle, so that modulated light is directed to a dichroic combiner 82. Dichroic combiner 82 has an arrangement of dichroic surfaces 84 that selectively reflect or transmit light according to wavelength, combining the modulated light from each light modulation assembly 40*r*, 40*g*, and 40*b* onto a single optical path through projection optics 70.

Figure 15:
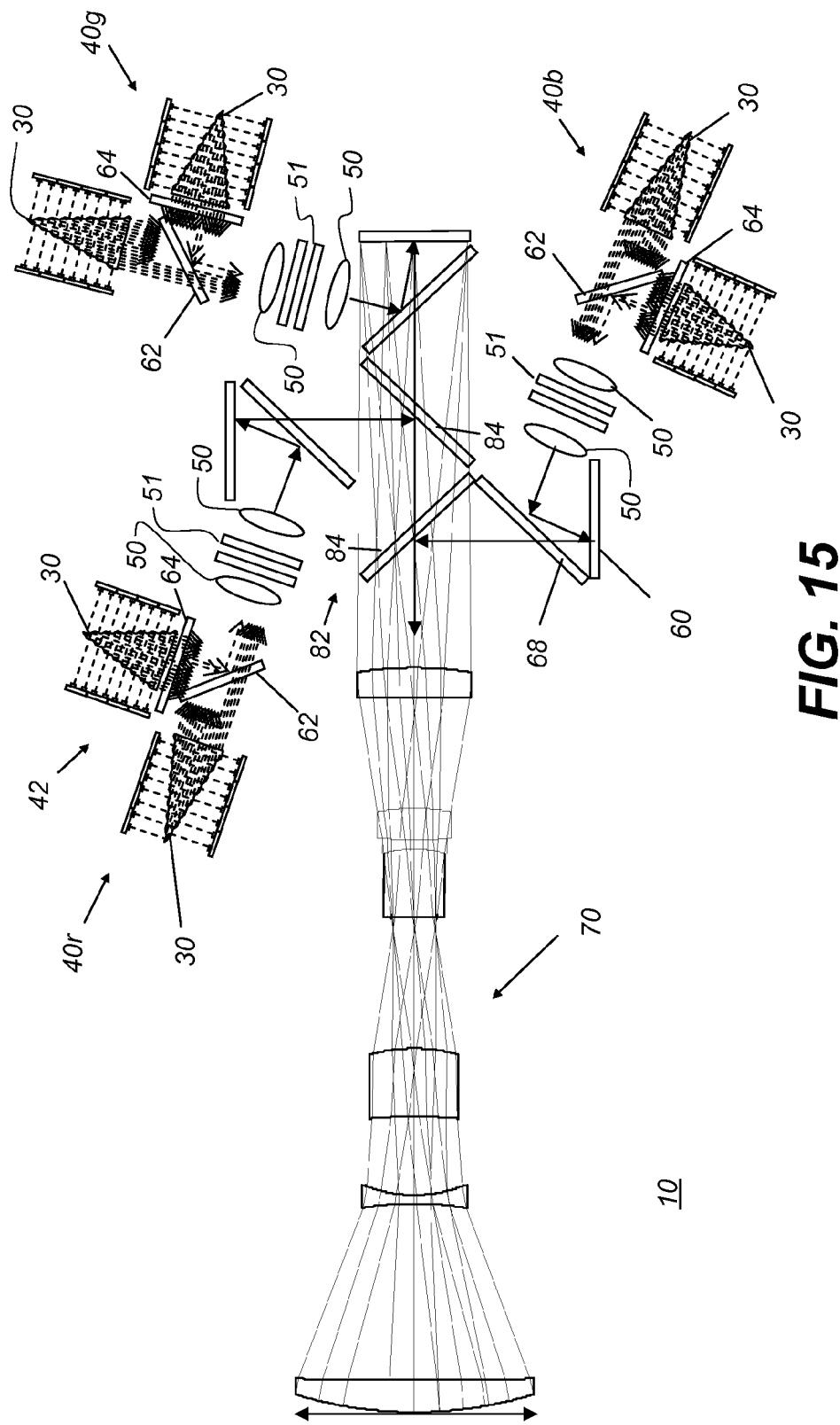
FIG. 15 is a schematic diagram of an alternate projection apparatus using polarized illumination with the light-redirecting prisms of FIG. 12, without light guides.

The schematic block diagram of FIG. 15 shows an alternate embodiment of projector apparatus 10 in an embodiment similar to that of FIG. 14, but without light guides 52. This embodiment can be advantaged because light guides 52 can tend to degrade polarization of the transmitted light. For such an embodiment, lenslet arrays would offer advantages for uniformizing the illumination, since polarization states are maintained. However, this type of embodiment does not enjoy the advantages provided by light guide 52, such as improved heat dissipation. In either embodiment, the laser light may be used in the near field condition or in the far field condition, where premixing of the light is provided to lower possible speckle and further improve the uniformity of the light going into the uniformizing optics of integrator 51.

Polarized light is modulated by micromirrors or other micro-electromechanical devices. Most Micro-Electromechanical Structures (MEMS) such as DLP devices use a metallic reflector, typically formed from aluminum. Metal mirrors create very small phase shifts upon reflection when handling light from a skew angle. The preferred polarization orientation, where the DLP device maintains the polarization state after reflection, has the polarization axis either in line with or orthogonal to the hinge pivot tilt of the micro-mirror, as shown in FIG. 15. Axis A (see FIG. 16) indicates the hinge pivot line for a DLP micromirror. Polarization states oriented along other axes with regard to the plane of the micro-mirror can be used with minimal effect to the residual polarization, however.

The present invention allows a number of variations from the exemplary embodiments described herein. For example, a variety of polarized laser light sources could be used as alternatives to VECSEL and other laser arrays. Light redirecting prism 30 can be made from many highly transmissive materials. For low power applications, plastics may be chosen, with molding processes being used that induce very little stress to the part. Similarly, it is desirable to have the materials chosen such that they induce minimal stress or thermally induced birefringence. Plastics such as acrylic or Zeonex from Zeon Chemicals would be examples of such materials. This is particularly important in the case where light redirecting prism 30 is used in a polarization based optical system.

For higher power applications, such as digital cinema where many high power lasers are required, plastics may be impractical for use with light redirecting prism 30, since the heat buildup from even small level of optical absorption could ultimately damage the material and degrade transmission. In this case, glass would be preferred. Again stress birefringence could be a problem for polarization-based projectors. In this case, glass with low stress coefficient of birefringence, such as SF57, could be used.

Another option would be to use a very low absorption optical glass, such as fused silica, to prevent heat up of the material and therefore keep the birefringence from occurring. These types of materials may not be conducive to creating a molded glass component, thus requiring conventional polishing and or assembly of multiple pieces to make up the completed prism. Where molding is desired, a slow mold process would be preferred, and annealing is desirable to reduce any inherent stress. A clean up polarizer may be desired or necessary to remove any rotated polarization states that might develop from any residual birefringence. This is primarily a trade off of efficiency, component cost and required polarization purity.

Embodiments of the present invention can be useful for shaping the aspect ratio of the light source so that it suits the aspect ratio of the spatial light modulator that is used.

A modification to the current DLP package would be required regarding the cover plate hermetic package. The current package is designed to provide an environmental seal as well as a defect-free surface to prevent scattering from impacting image quality. As such, the process of laser welding and thermally fusing windows into mechanical frames induces significant and inconsistent birefringence into each package. Variations in retardance of over 3 nm have been observed across sample devices. This would negatively impact the maintenance of the polarization state out of the device. Therefore new window packaging would be necessary in order to properly utilize DLP devices with polarized light. Packages can be improved by utilizing a glass that has a low coefficient stress or thermally induced birefringence, such as SF57. An alternate approach would be to provide stress free mounting of a window to the window frame, for example using RTV to bond the window in place. Further isolation, such that the mechanics of the window frame are rigid with respect to the window, but flexible with respect to the bonding surfaces to the chip frame, would also be advantageous. Likewise, this approach could be reversed. Further, it would benefit the procedure for bonding the window to the frame and the frame to the chip mounting if performed at the carefully controlled chip operational temperatures, so as to avoid stresses from an operational and packaging temperature difference.

Embodiments of the present invention can be used with light guides 52 of different dimensions, allowing the light guide to be not only flexible, but also shaped with substantially the same aspect ratio to that of the modulator. For digital cinema this ratio would be approximately 1.9:1. An alternate embodiment could use a square core fiber. Similarly, a round core optical waveguide, such as common multimode optical fiber can be utilized.

While an optical waveguide between the illumination combiner 42 and integrator 51 is shown for a number of embodiments, it is commonly known that other methods of relaying and separating the illumination sources from the projection optical engine are possible. Relaying with common lenses as shown in FIG. 15 is one approach to achieving the desired thermal and spatial separation desired.

Figure 16:
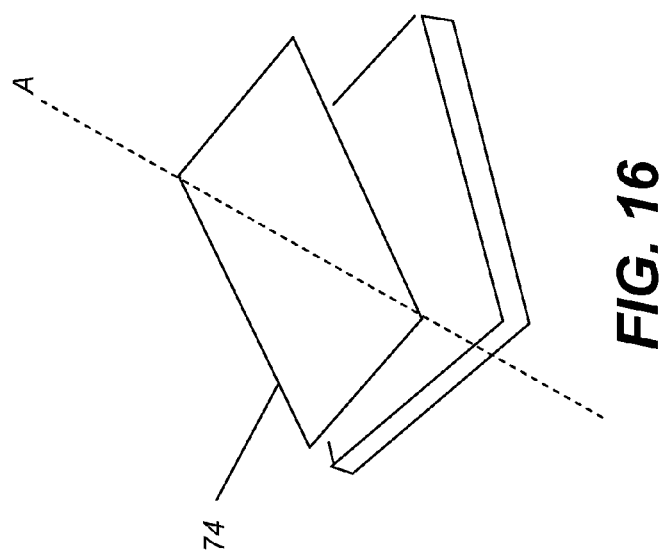
FIG. 16 is a perspective view showing a single pixel modulator and its axis of rotation.

Most Micro-Electromechanical Structures (MEMS) such as DLP devices use a metallic reflector, typically formed from aluminum. Metal mirrors create very small phase shifts upon reflection when handling light from a skew angle, where the plane polarized light vibrates off from either in the plane of incidence or perpendicular to it. The preferred polarization orientation, where the DLP device maintains the polarization state after reflection, has the polarization axis either in line with or orthogonal to the hinge pivot tilt of the micro-mirror 74 (where the plane of polarization, either s or p, is at a normal incidence to the mirror), as shown in FIG. 16. Axis A indicates the hinge pivot line for a DLP micromirror. Polarization states oriented along other axes with regard to the plane of the micro-mirror can be used with minimal effect to the residual polarization, however. This residual ellipticity results in crosstalk between the two polarization states.

The use of polarized laser light sources offers significant advantages for the projection of stereoscopic imagery. The efficiency gains over the conventional illumination sources discussed earlier allows the projector to more easily deliver images with brightness on parity with conventional 2D projection.

The invention has been described in detail with particular reference to certain preferred embodiments thereof, but it will be understood that variations and modifications can be effected within the spirit and scope of the invention. For example, where laser arrays are described in the detailed embodiments, other solid-state emissive components could be used as an alternative. Supporting lenses may also be added to each optical path. In optical assemblies shown herein, the order of the uniformization or light integration and relaying may be reversed without significant difference in effect.

Thus, what is provided is an apparatus and method using polarized illumination for enhanced brightness or stereoscopic digital cinema projection.

PARTS LIST

Figure 1:
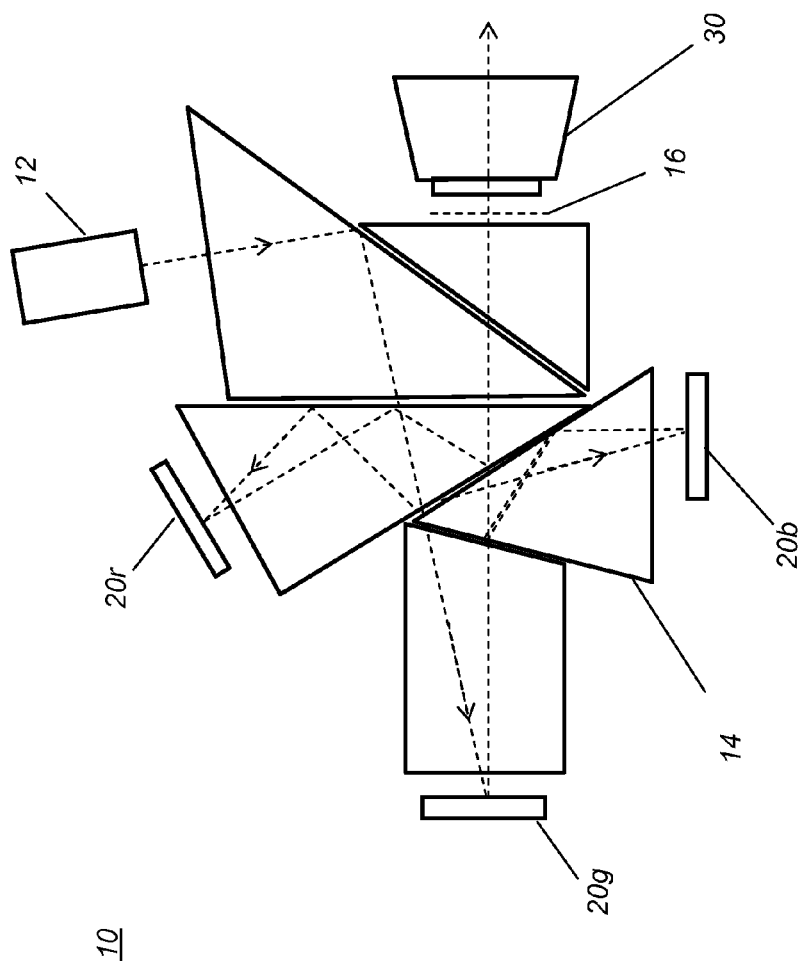
FIG. 1 is a schematic block diagram of a conventional projection apparatus using a combining prism for the different color light paths.
Figure 2:
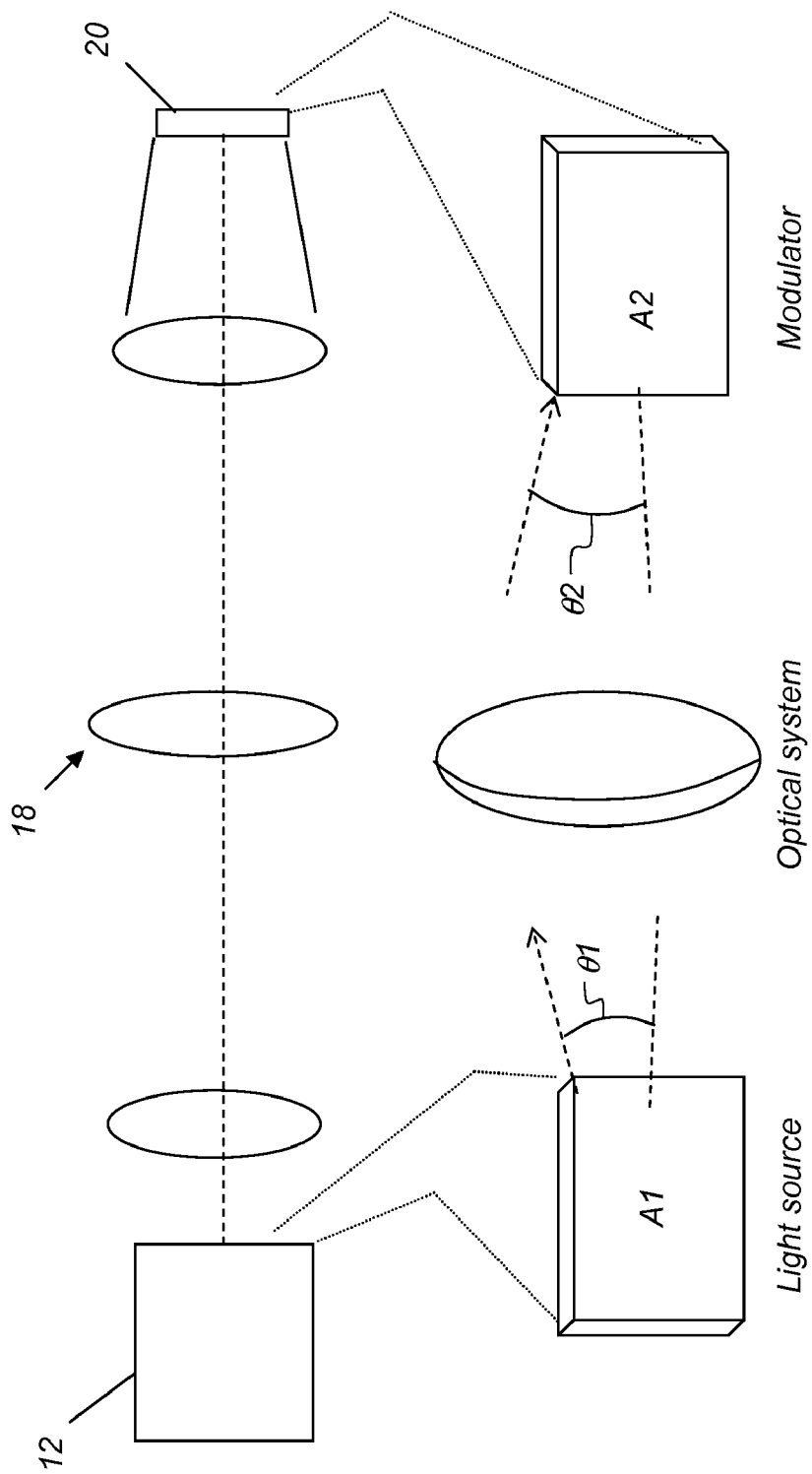
FIG. 2 is a representative diagram showing etendue for an optical system.

10. Projector apparatus
12. Light source
14. Prism assembly
16. Position
18. Optics
20, 20r, 20g, 20b. Spatial light modulator
26. Laser
28. Incidence facet
30. Light redirecting prism (projection lens—FIG. 1)
32. Incident face
34. Surface face
36. Redirection surface
38. Light-redirecting facet
40r, 40g, 40b. Light modulation assembly
42. Illumination combiner
44, 44', 44a, 44b. Solid-state light array
46. Mirror
50. Lens
51. Integrator
52. Light guide
54. Lens
56. Logic controller
58. Polarized glasses
60. Spatial light modulator
62. Polarization beamsplitter
64. Half wave plate
68. Film coated surface
70. Projection optics
74. Micro-mirror
76, 78. Polarizer
80. Display surface
82. Dichroic combiner
84. Dichroic surface
A. Axis
A1. Light source
A2. Modulator
D1, D1'. Emission direction
D2. Output direction
L. Length direction
θ1. Output angle
θ2. Acceptance angle

The invention claimed is:

1. A system for viewing stereoscopic images, comprising:
polarized glasses worn by a viewer for viewing stereoscopic images formed on a display surface, wherein a polarized filter for a first eye transmits polarized light that is orthogonal to polarized light transmitted by a polarized filter for a second eye; and
a stereoscopic digital image projector comprising:
an illumination system comprising:
first and second polarized light sources, wherein the first and second polarized light sources have orthogonally disposed polarization axes; and
a polarization beamsplitter disposed to direct light of both the first and second polarizations along a common illumination axis;
a controller system that alternately energizes the first and second polarized light sources to provide illumination of one polarization at a time;
a single MEMS spatial light modulator for alternately modulating the light beams of the first and second polarizations on the common illumination axis; and
projection optics in the path of modulated light from the MEMS spatial light modulator and directing the light onto the display surface.

2. The stereoscopic digital image projector of claim 1 wherein the illumination system is a first illumination system, wherein the polarization beamsplitter is a first polarization beamsplitter, wherein the common illumination axis is a first common illumination axis, wherein the MEMS spatial light modulator is a first MEMS spatial light modulator, and wherein the stereoscopic digital image projector further comprises:
at least a second illumination system comprising:
third and fourth polarized light sources, wherein the third and fourth polarized light sources have orthogonally disposed polarization axes and produce light in a different wavelength band than the first and second polarized light sources; and
a second polarization beamsplitter disposed to direct light of both the third and fourth polarization along a second common illumination axis; and
a second MEMS spatial light modulator for alternately modulating the light beams of the third and fourth polarizations on the second common illumination axis;
wherein the projection optics direct the light from the first and second illumination systems onto the display surface to provide a color image having at least two spectral bands.

3. The projection apparatus of claim 1 wherein the MEMS spatial light modulator comprises a reflective metallic structure, and wherein the polarization plane of the linearly polarized light incident on the metallic structure is substantially normal to the plane of the reflective metal structure.

4. The projection apparatus of claim 1 wherein the MEMS spatial light modulator comprises a reflective metallic structure, and where the plane polarized light vibrates in the plane of incidence of the reflective metal structure.

5. A color projection apparatus comprising:
a) two or more light modulation assemblies for a digital image projector, each light modulation assembly providing light of a predetermined wavelength band and comprising:
i) a first polarized light source comprising:
two or more solid state laser arrays disposed to provide light of a first polarization in a first emission direction, wherein each laser array comprises a plurality of lasers extended in a first length direction; and
a first light redirecting prism comprising:
a first incident surface disposed to receive light incident in said first emission direction;
a first redirection surface having a plurality of light-redirecting facets, each light redirecting facet extended in the length direction and oriented at an oblique angle relative to the first emission direction, wherein the oblique angle orientation provides a reflection surface to incident light; and
a first output surface for providing redirected light of the first polarization from the light-redirecting facets;
ii) a second polarized light source comprising:
two or more solid state laser arrays disposed to provide light of the first polarization in a second emission direction, wherein each laser array comprises a plurality of lasers extended in a second length direction;

a half wave plate for conditioning the light from the second polarized light source to provide light of a second polarization that is orthogonal to the first polarization; and a second light redirecting prism comprising:

a second incident surface disposed to receive light incident in said second emission direction;

a second redirection surface having a plurality of light-redirecting facets, each light redirecting facet extended in the second length direction and oriented at an oblique angle relative to the second emission direction, wherein the oblique angle orientation provides a reflection surface to incident light; and a second output surface for providing redirected light from the light-redirecting facets;

iii) a polarization beamsplitter disposed to direct light of either the first or second polarization as illumination along a common illumination axis;

iv) a controller system that alternately energizes the first and second polarized light sources to provide illumination of one polarization at a time;

v) a single spatial light modulator for alternately modulating the light beams of the first and second polarizations disposed to accept the illumination on the common illumination axis and to provide a modulated light output;

b) a color combiner disposed to accept the modulated light output from each of the two or more light modulation assemblies and to direct the modulated light onto an output axis; and c) a projection lens disposed to direct the modulated light toward a display surface.

6. The color projection apparatus of claim 5 further comprising a light guide disposed to guide light from the common illumination axis toward the spatial light modulator.

7. The color projection apparatus of claim 6 wherein the waveguide element substantially matches the proportions of the spatial light modulator.

8. The color projection apparatus of claim 6 wherein the waveguide element substantially is one half the proportions of the spatial light modulator.

9. The color projection apparatus of claim 6 wherein the waveguide element substantially maintains the polarization properties of the input illumination light.

10. The color projection apparatus of claim 5 wherein the spatial light modulator is a digital micromirror device.

* * * * *